(12) United States Patent
Nakamura et al.

(10) Patent No.: US 8,169,096 B2
(45) Date of Patent: May 1, 2012

(54) POWER GENERATOR AND MOTOR DEVICE

(75) Inventors: Kazuyoshi Nakamura, Azumino (JP); Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 604 days.

(21) Appl. No.: 12/368,359

(22) Filed: Feb. 10, 2009

(65) Prior Publication Data
US 2009/0206607 A1    Aug. 20, 2009

(30) Foreign Application Priority Data

Feb. 15, 2008  (JP) .................................. 2008-34329
Jan. 23, 2009  (JP) .................................. 2009-12565

(51) Int. Cl.
*H02P 9/04*   (2006.01)
(52) U.S. Cl. ........................................... 290/44; 290/55
(58) Field of Classification Search .................... 290/43, 290/44, 54, 55; 415/1, 2.1, 4.1, 7; 416/1
See application file for complete search history.

(56) References Cited

U.S. PATENT DOCUMENTS

| | | | |
|---|---|---|---|
| 4,613,763 A * | 9/1986 | Swansen | 290/44 |
| 6,608,397 B2 | 8/2003 | Makino et al. | |
| 6,720,670 B2 | 4/2004 | Makino et al. | |
| 2008/0191483 A1 * | 8/2008 | Takeuchi | 290/43 |
| 2009/0184519 A1 * | 7/2009 | Nies et al. | 290/44 |
| 2009/0189394 A1 * | 7/2009 | DeAngeles | 290/44 |

FOREIGN PATENT DOCUMENTS

| | | |
|---|---|---|
| JP | 05-338593 | 12/1993 |
| JP | 2001-298982 | 10/2001 |
| JP | 2002-147334 | 5/2002 |
| JP | 2003-232274 | 8/2003 |
| JP | 2003-314429 | 11/2003 |
| JP | 2003-324896 | 11/2003 |
| JP | 2004-339953 | 12/2004 |
| JP | 2005-094936 | 4/2005 |
| JP | 2005-155509 | 6/2005 |
| JP | 2005-261135 | 9/2005 |
| JP | 2005-295686 | 10/2005 |
| JP | 2008-215156 | 9/2008 |
| WO | WO02/087066 | 10/2002 |

* cited by examiner

*Primary Examiner* — Dang Le
(74) *Attorney, Agent, or Firm* — Harness, Dickey & Pierce, P.L.C.

(57) ABSTRACT

The fluid power generator is provided. The fluid power generator includes: a rotating member that rotates by fluid force; a generator motor that is mechanically linked with the rotating member and that is configured to function both as a generator and as a motor; a rotation speed meter that measures a rotation speed of the generator motor; and a controller that controls the generator motor, wherein the controller has a control mode to keep the rotation of the rotating member irrespective of a variation in flow rate of the fluid.

10 Claims, 10 Drawing Sheets

POWER GENERATOR AND MOTOR DEVICE

CROSS-REFERENCE TO RELATED APPLICATIONS

The present application claims the priority based on Japanese Patent Applications No. 2008-34329 filed on Feb. 15, 2008; and No. 2009-12565 filed on, Jan. 23, 2009, the disclosures of which are hereby incorporated by reference in their entireties.

BACKGROUND OF THE INVENTION

1. Field of the Invention

The present invention relates to a fluid power generator, as well as to a motor device having a function of electric power regeneration.

2. Description of the Related Art

For reduction of carbon dioxide, power generations by utilizing natural energies, such as wind power generation, hydraulic power generation, and photovoltaic power generation, have been attracting a great deal of attention. Enhancement of the efficiency of such natural energy power generations is of great importance to solve the environmental problems.

A fluid power generator may be constructed, for example, with application of a brushless motor structure. One example of the brushless motor structure is disclosed in JP 2001-298982A.

One typical example of the fluid power generator is a wind power generator. A prior art structure of the wind power generator adopts a heavy weight of blades, in order to prevent rotation of the blades from being stopped by a decrease of wind force and to prevent a decrease in power generation efficiency with a variation in rotation speed caused by the varying wind force. The heavy blades enhance the inertial force of rotation and keep the rotation of the generator.

This prior art structure, however, undesirably expands the dimensions of the whole wind power generator in order to support the heavy blades and requires the enhanced intensity of a support member for supporting the heavy blades in the wind power generator. Such drawbacks are not characteristic of the wind power generator but are commonly found in various fluid power generators. Efficient regeneration of electric power in a motor drive is also highly demanded.

SUMMARY

An object of the present invention is to provide technology that is able to keep the rotation of a fluid power generator irrespective of a variation in flow rate of a fluid. Another object of the present invention is to provide technology that is able to provide a motor device having a function of regenerating electric power by a different technique from the conventional technique.

According to an aspect of the present invention, a fluid power generator is provided. The fluid power generator comprises: a rotating member that rotates by fluid force; a generator motor that is mechanically linked with the rotating member and that is configured to function both as a generator and as a motor; a rotation speed meter that measures a rotation speed of the generator motor; and a controller that controls the generator motor, wherein the controller has a control mode to keep the rotation of the rotating member irrespective of a variation in flow rate of the fluid.

The fluid power generator according to this aspect of the invention controls the generator motor functioning both as the generator and as the motor in such a manner as to allow the rotation of the fluid power generator to be kept irrespective of a variation in flow rate of the fluid.

According to another aspect of the present invention, a motor device having a function of electric power regeneration is provided. The motor device comprises: a position signal generator that generates a position signal representing a relative position of an electromagnetic coil to a permanent magnet in the motor device; a driving signal generator that generates a driving signal specifying a voltage application time period of the electromagnetic coil, based on the position signal; and a regeneration signal generator that generates a regeneration signal specifying an electric power regeneration time period of the electromagnetic coil, based on the position signal, wherein the voltage application time period is set to appear periodically during each half cycle period of the position signal, and the electric power regeneration time period is set to appear in a residual time period other than the voltage application time period.

The motor device according to this aspect of the invention allows regeneration of electric power in the residual time period without application of the voltage to the electromagnetic coil, while periodically being driven with application of the voltage.

The technique of the invention is not restricted to the power generator or the motor device having any of the arrangements discussed above but is also actualized by diversity of other applications, for example, a power generation method, a power generation system, a motor device control method, a motor device control system, integrated circuits for attaining such methods and systems, computer programs for the same purpose, and recording media in which such computer programs are recorded.

DESCRIPTION OF THE PREFERRED EMBODIMENT

Next, aspects of the present invention will be described in the following order on the basis of embodiments:
A. First Embodiment:
B. Modified Examples of First Embodiment:
C. Second Embodiment:

A. First Embodiment

Figure 1:
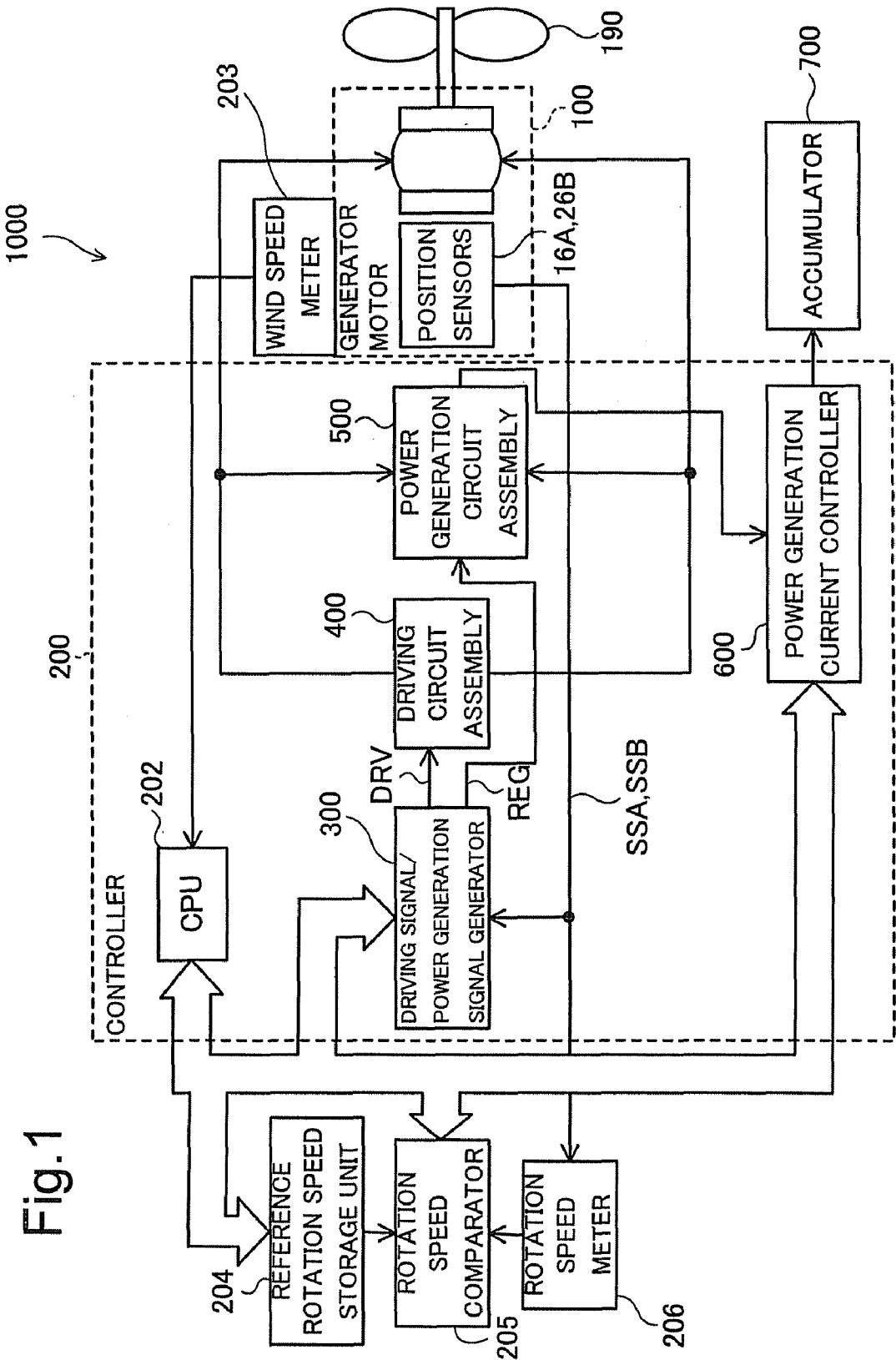
FIG. 1 is a block diagram schematically illustrating the general configuration of a power generator 1000 in a first embodiment of the invention.

FIG. 1 is a block diagram schematically illustrating the general configuration of a power generator 1000 in a first embodiment of the invention. The power generator 1000 has a generator motor 100, a controller 200, a wind speed meter 203, a reference rotation speed storage unit 204, a rotation speed comparator 205, a rotation speed meter 206, and an accumulator 700. The controller 200 includes a CPU 202, a driving signal/power generation signal generator 300, a driving circuit assembly 400, a power generation circuit assembly 500, and a power generation current controller 600. The generator motor 100 has blades 190 rotated by the wind force and two position sensors 16A and 26B provided to detect the relative positions of a rotor in the generator motor 100.

The generator motor 100 has a power generation function of generating electric power by the wind force, a driving function of being driven as a motor to rotate the blades 190, and a braking function of being driven as the motor in an opposite direction to the rotating direction of the blades 190 to control the rotation of the blades 190. The generator motor 100 has a stator having two phase coil arrays (A-phase coil array and B-phase coil array) and a rotor having a permanent magnet array as described later in detail.

The two rotation sensors 16A and 26B are respectively attached to the A-phase coil array and to the B-phase coil array. For example, magnetic sensors may be adopted for the rotation sensors 16A and 26B. In application of the magnetic sensors for the rotation sensors 16A and 26B, the rotation sensor 16A detects the magnetism of the permanent magnet array on the rotor and outputs a sensor signal SSA representing the position of the rotor relative to the A-phase coil array. Similarly the rotation sensor 26B outputs a sensor signal SSB representing the position of the rotor relative to the B-phase coil array. The sensor signals SSA and SSB have periodical waveforms by rotation of the generator motor 100. The frequencies of the sensor signals SSA and SSB are accordingly correlated to the rotation speed of the generator motor 100. The waveforms of the sensor signals SSA and SSB are explained later in detail with reference to FIGS. 5 and 6.

The rotation speed meter 206 measures the rotation speed of the generator motor 100, based on the frequency of the sensor signal SSA or the frequency of the sensor signal SSB. The reference rotation speed storage unit 204 stores reference rotation speeds therein. The 'reference rotation speeds' specify an upper limit value and a lower limit value of rotation speed ensuring adequate power generation. The lower limit value of the reference rotation speed and the upper limit value of the reference rotation speed are respectively referred to as 'minimum reference rotation speed' and 'maximum reference rotation speed'. The minimum reference rotation speed is a lowest possible rotation speed that enables the rotation of the generator motor 100 to be kept. The two reference rotation speeds are arbitrarily updated by the CPU 202. The rotation speed comparator 205 compares the minimum reference rotation speed and the maximum reference rotation speed with the actual rotation speed of the generator motor 100 measured by the rotation speed meter 206 and sends a result of the comparison to the CPU 202.

The CPU 202 sends a command to the driving signal/power generation signal generator 300 based on the result of comparison received from the rotation speed comparator 205 to keep the actual rotation speed of the generator motor 100 in a specific range defined by the minimum reference rotation speed and the maximum reference rotation speed (hereafter referred to as 'reference rotation speed range'). The CPU 202 also sends a command to the driving signal/power generation signal generator 300 based on a wind speed Vc measured by the wind speed meter 203. The wind speed meter 203 may be omitted in a modified configuration where the CPU 202 does not utilize the wind speed Vc. The CPU 202 also sends a control command to the power generation current controller 600.

The driving signal/power generation signal generator 300 generates a power generation signal REG and a driving signal DRV, in response to the command from the CPU 202 and the sensor signals SSA and SSB. The power generation signal REG rises to a high (H) level to enable the power generation function of the generator motor 100. The driving signal DRV, on the other hand, rises to an H level to enable the driving function and the braking function of the generator motor 100. Although not being specifically illustrated in FIG. 1, the driving signal DRV includes two A-phase driving signals DRVA1 and DRVA2 used to control the A-phase coil array and two B-phase driving signals DRVB1 and DRVB2 used to control the B-phase coil array. Similarly the power generation signal REG also has two A-phase power generation signals REGA1 and REGA2 and two B-phase power generation signals REGB1, and REGB2. This arrangement allows independent control of the A-phase coil array and the B-phase coil array.

The power generation circuit assembly 500 supplies the electric current, which is generated by the generator motor 100 at the H level of the power generation signal REG, to the power generation current controller 600. The driving circuit assembly 400 excites the coil arrays of the generator motor 100 at the H level of the driving signal DRV and makes the generator motor 100 function as a motor. The power generation current controller 600 controls the amount of electric current to be supplied to the accumulator 700 according to the electric current supplied from the power generation circuit assembly 500.

Figure 2B:
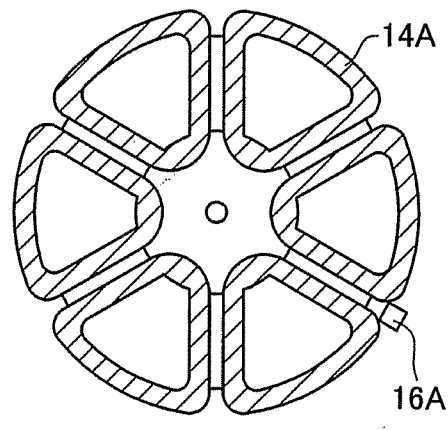
FIGS. 2B through 2D respectively show the structures of the A-phase coil array 14A of the stator 10, the rotor 30, and the B-phase coil array 24B of the stator 10.
Figure 2A:
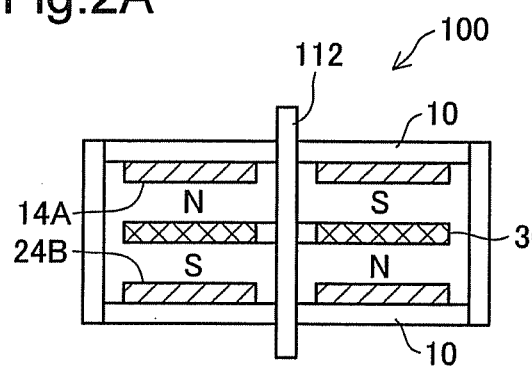
FIG. 2A is a sectional view showing the schematic structure of the main body of the generator motor 100.

FIG. 2A is a sectional view showing the schematic structure of the main body of the generator motor 100. The generator motor 100 has a substantially disk-shaped stator 10 and a substantially disk-shaped rotor 30. The rotor 30 has a magnet array 34M of multiple magnets and is fastened to a rotating shaft 112. The magnets of the magnet array 34M are magnetized in a vertical direction. The stator 10 has an A-phase coil array 14A located above the rotor 30 and a B-phase coil array 24B located below the rotor 30.

Figure 2C:
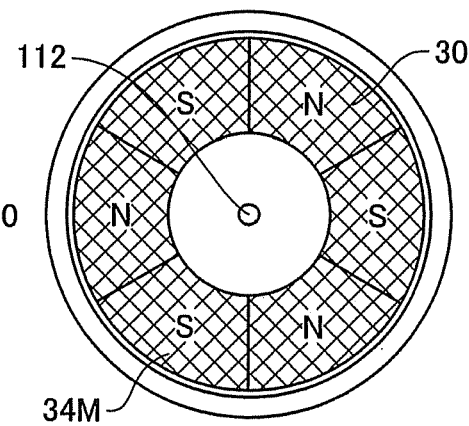
Figure 2D:
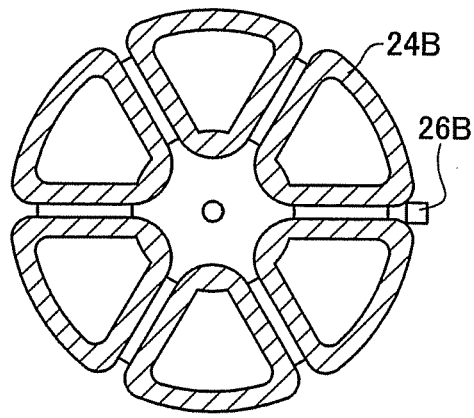

FIGS. 2B through 2D respectively show the structures of the A-phase coil array 14A of the stator 10, the rotor 30, and the B-phase coil array 24B of the stator 10. In this illustrated example, the A phase-coil array 14A and the B-phase coil array 24B respectively have six coils, while the magnet array 34M has six magnets. The number of the coils in each coil array and the number of the magnets in the magnet array are, however, not restricted to this number but may be set arbitrarily.

Figure 3:
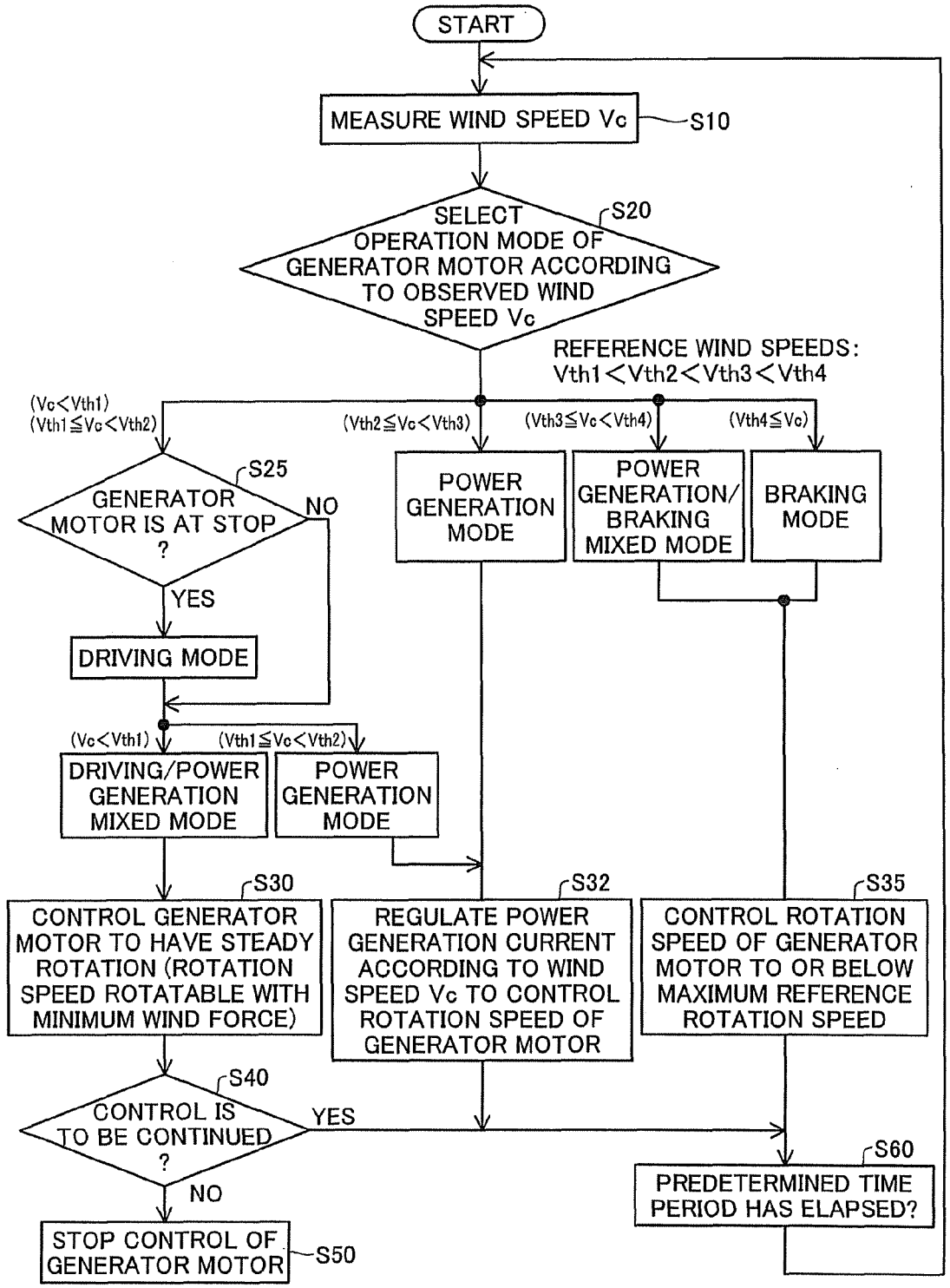
FIG. 3 is a flowchart showing a control routine of the power generator 1000.

FIG. 3 is a flowchart showing a control routine of the power generator 1000. The wind speed meter 203 measures the wind speed Vc at step S10. The CPU 202 selects one operation mode or a combination of multiple operation modes among five possible operation modes of the generator motor 100 according to the range of the observed wind speed Vc at step S20. The five operation modes include 'driving mode', 'driving/power generation mixed mode', 'power generation mode', 'power generation/braking mixed mode', and 'braking mode'.

In the 'driving mode', both the A-phase coil array 14A and the B-phase coil array 24B activate only the driving function. In the 'power generation mode', both the A-phase coil array 14A and the B-phase coil array 24B activate only the power generation function. In the 'braking mode', both the A-phase coil array 14A and the B-phase coil array 24B activate only the braking function.

In the 'driving/power generation mixed mode', the generator motor 100 simultaneously activates the two functions, the driving function and the power generation function. In one typical example of the driving/power generation mixed mode, the A-phase coil array 14A activates the driving function, while the B-phase coil array 24B activates the power generation function. In another typical example of the driving/power generation mixed mode, at least one of the A-phase coil array 14A and the B-phase coil array 24B changes over the activated function between the driving function and the power generation function in one period of the sensor signal SSA or SSB. In the 'power generation/braking mixed mode', the generator motor 100 simultaneously activates the two functions, the power generation function and the braking function.

The rotation speed of the generator motor 100 increases during activation of the driving function of the coil array, and decreases during activation of the power generation function of the coil array. Activation of the braking function of the coil array further decreases the rotation speed of the generator motor 100. Namely controlling the driving function, the power generation function, and the braking function of the coil array allows the rotation speed of the generator motor 100 to be controlled according to the operation status of the coil array. One concrete procedure of the control varies the duty ratios of the driving signal DRV and the power generation signal REG and changes over the operations of the respective coil arrays among a driving time period with activation of the driving function, a power generation time period with activation of the power generation function, and a braking time period with activation of the braking function, based on the observed wind speed Vc, so as to control the rotation speed of the generator motor 100.

At step S20, the observed wind speed Vc is compared with four reference wind speeds Vth1 through Vth4 satisfying the relation of Vth1<Vth2<Vth3<Vth4.

When the observed wind speed Vc is lower than the first reference wind speed Vth1 or when the observed wind speed Vc is not lower than the first reference wind speed Vth1 but is lower than the second reference wind speed Vth2, the CPU 202 determines whether the generator motor 100 is at stop at step S25.

When the observed wind speed Vc is lower than the first reference wind speed Vth1 and the generator motor 100 is at stop, the generator motor 100 is not allowed to keep unassisted steady rotation with only the wind force (that is, a rotation speed rotatable with the minimum wind force) but is allowed to keep steady rotation with slight driving assistance. In this case, the driving mode and the subsequent driving/power generation mixed mode are selected as the operation mode of the generator motor 100. In the condition of very weak wind force, the generator motor 100 is set in the driving mode to activate the driving function and increase the rotation speed to the level of steady rotation. When the rotation speed of the generator motor 100 reaches the level of steady rotation, the operation mode of the generator motor 100 shifts from the driving mode to the driving/power generation mixed mode to perform power generation with keeping the steady rotation of the generator motor 100 with assistance of the driving function to compensate for the insufficient wind force. For example, the operation mode of the generator motor 100 is controlled such as to make the A-phase coil array 14A activate both the driving function and the power generation function and to make the B-phase coil array 24B activate only the power generation function. The unassisted steady rotation of the generator motor 100 means that the generator motor 100 is rotated with only the wind force at the rotation speed of not lower than the minimum reference rotation speed under the condition of the constant wind force.

When the observed wind speed Vc is not lower than the first reference wind speed Vth1 but is lower than the second reference wind speed Vth2 and the generator motor 100 is at stop, the level of wind force does not allow an unassisted start of rotation of the generator motor 100 but keeps the rotation of the generator motor 100 at the rotation speed of not lower than the level of steady rotation. In this case, the driving mode and the subsequent power generation mode are selected as the operation mode of the generator motor 100. In the condition of relatively weak wind force, the generator motor 100 is not allowed to start rotation with only the wind force. The generator motor 100 is accordingly set in the driving mode to activate the driving function and increase the rotation speed to the level of steady rotation (the rotation speed rotatable with the minimum wind force). When the rotation speed of the generator motor 100 reaches the level of steady rotation, the driving function is inactivated and the operation mode of the generator motor 100 shifts from the driving mode to the power generation mode. In the power generation mode, the generator motor 100 generates electric power with the A-phase coil array 14A and the B-phase coil array 24B by the unassisted rotation with only the wind force.

When it is determined at step S25 that the generator motor 100 is not at stop, the driving mode is not selected but either the driving/power generation mixed mode or the power generation mode is selected according to the range of the observed wind speed Vc as the operation mode of the generator motor 100.

When the observed wind speed Vc is not lower than the second reference wind speed Vth2 but is lower than the third reference wind speed Vth3, the power generation mode is selected as the operation mode of the generator motor 100. In the condition of adequate wind force having appropriate strength for power generation, the level of wind force allows an unassisted start of rotation of the generator motor 100 and keeps the rotation of the generator motor 100 at the rotation speed of not lower than the level of steady rotation. In this case, the generator motor 100 is set in the power generation mode to generate electric power with the A-phase coil array 14A and the B-phase coil array 24B.

When the observed wind speed Vc is not lower than the third reference wind speed Vth3 but is lower than the fourth reference wind speed Vth4, the power generation/braking mixed mode is selected as the operation mode of the generator motor 100. In the condition of relatively strong wind force, the level of wind force makes the rotation of the generator motor 100 exceed the maximum reference rotation speed. In this case, the generator motor 100 is set in the power generation/braking mixed mode to perform power generation with keeping the rotation speed of the generator motor 100 to or below the maximum reference rotation speed. For example, the operation mode of the generator motor 100 is controlled such as to make the A-phase coil array 14A activate both the braking function and the power generation function and to make the B-phase coil array 24B activate only the power generation function.

When the observed wind speed Vc is not lower than the fourth reference wind speed Vth4, the braking mode is selected as the operation mode of the generator motor 100. In the condition of very strong wind force, the level of wind force makes the rotation speed of the generator motor 100 significantly exceed the maximum reference rotation speed. In this case, the generator motor 100 is set in the braking mode to brake the generator motor 100 with the A-phase coil array 14A and the B-phase coil array 24B. Such control effectively prevents an abnormal increase in rotation speed of the generator motor 100 to an extremely high rotation speed over the maximum reference rotation speed to thereby protect the internal mechanism of the generator motor 100 from damages.

After selection of the operation mode of the generator motor 100 according to the range of the wind speed Vc at step S20, the rotation speed of the generator motor 100 is controlled to be kept in the reference rotation speed range according to the level of wind force as discussed above (steps S30, S32, and S35). A concrete procedure changes over the operations of the respective coils arrays among the driving time period, the power generation time period, and the braking time period, based on the observed wind speed Vc. In the case of selection of either the power generation mode or the power generation/braking mixed mode at step S20, the amount of electric current supplied to the accumulator 700 may be regulated by the power generation current controller 600 (see FIG. 1) according to the observed wind speed Vc (step S32). Such regulation enables the rotation speed of the generator motor 100 to be kept in the reference rotation speed range.

In the case of selection of the driving/power generation mixed mode at step S20, it is determined at step S40 whether control of the generator motor 100 is to be continued. At least one of the following conditions may be adopted for such determination:

(1) when the wind speed Vc has been not higher than a preset reference wind speed for more than a predetermined reference time period, the control for keeping the steady rotation of the generator motor 100 (rotation speed rotatable with the minimum wind force) is to be stopped; and (2) when a result of subtraction of an amount of electric power consumed by the driving function of the generator motor 100 in a specific time period from an amount of electric power generated by the power generation function of the generator motor 100 in the specific time period is less than a preset reference amount of electric power, the control for keeping the steady rotation of the generator motor 100 (rotation speed rotatable with the minimum wind force) is to be stopped.

When it is determined at step S40 that the control for keeping the steady rotation of the generator motor 100 (rotation speed rotatable with the minimum wind force) is to be stopped, the control of the generator motor 100 is stopped at step S50. This effectively prevents the operation of the power generator 1000 from being continued for a long time period in the state of consuming electric power for driving the generator motor 100 (in the driving/power generation mixed mode).

On elapse of a predetermined time period (step S60) after the control of the rotation speed of the generator motor 100 according to the wind speed Vc at one of steps S30, S32, and S35, the control routine goes back to step S10 to measure the wind speed Vc and to step S20 to select one operation mode or a combination of multiple operation modes among the five operation modes. Even in the selection of the driving/power generation mixed mode at step S20, the control routine may omit the determination at step S40 and directly goes to step S60.

Figure 4:
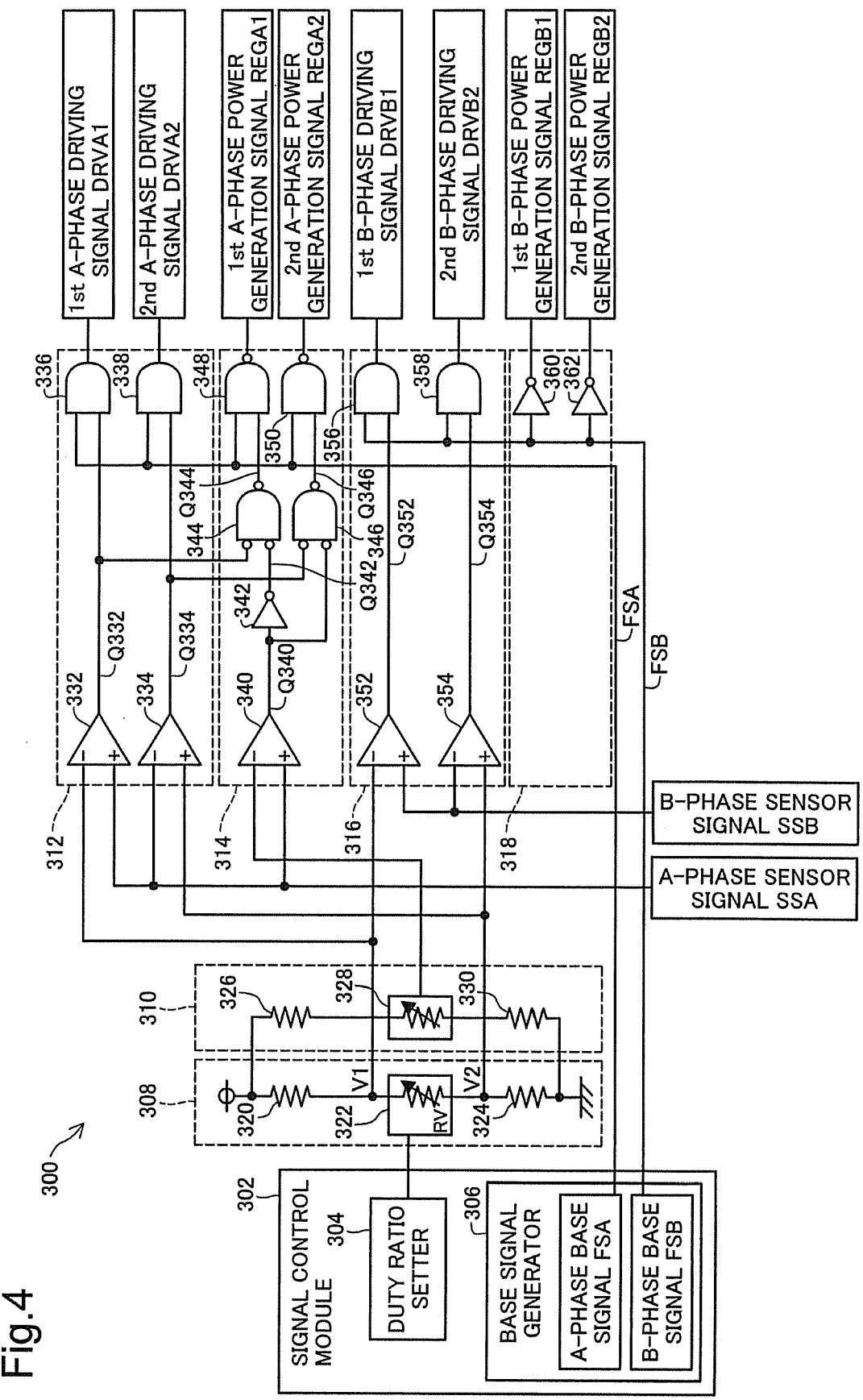
FIG. 4 is an explanatory view showing the internal structure of the driving signal/power generation signal generator 300.

FIG. 4 is an explanatory view showing the internal structure of the driving signal/power generation signal generator 300. The driving signal/power generation signal generator 300 includes a signal control module 302, a hysteresis level setting module 308, an intermediate voltage output module 310, an A-phase driving signal generator circuit 312, an A-phase power generation signal generator circuit 314, a B-phase driving signal generator circuit 316, and a B-phase power generation signal generator circuit 318.

The signal control module 302 has a duty ratio setter 304 and a base signal generator 306. The hysteresis level setting module 308 has resistors 320 and 324 and an electronic variable resistor 322. The intermediate voltage output module 310 has resistors 326 and 330 and an electronic variable resistor 328.

The A-phase driving signal generator circuit 312 includes comparators 332 and 334 and AND gates 336 and 338. The A-phase power generation signal generator circuit 314 includes a comparator 340, an inverter 342, negative-logic AND gates 344 and 346, and NAND gates 348 and 350. The B-phase driving signal generator circuit 316 includes comparators 352 and 354 and AND gates 356 and 358. The B-phase power generation signal generator circuit 318 includes inverters 360 and 362.

The duty ratio setter 304 of the signal control module 302 sets a resistance value Rv in the electronic variable resistor 322, in response to a command from the CPU 202 (see FIG. 1). The base signal generator 306 of the signal control module 302 generates an A-phase base signal FSA and a B-phase base signal FSB, in response to a command from the CPU 202. The A-phase base signal FSA has a high (H) level to activate both the driving function and the power generation function of the A-phase coil array 14A and has a low (L) level to activate only the power generation function of the A-phase coil array 14A. The B-phase base signal FSB, on the other hand, has an H level to activate only the driving function of the B-phase coil array 24B and has an L level to activate only the power generation function of the B-phase coil array 24B.

In the A-phase driving signal generator circuit 312, the comparator 332 compares a voltage value V1 between the resistor 320 and the electronic variable resistor 322 with the A-phase sensor signal SSA and outputs a signal Q332 representing a result of the comparison. The comparator 334 compares a voltage value V2 between the electronic variable resistor 322 and the resistor 324 with the A-phase sensor signal SSA and outputs a signal Q334 representing a result of the comparison. The AND gate 336 performs a logical AND of the A-phase base signal FSA and the signal Q332 and generates the first A-phase driving signal DRVA1 representing the logical product. The AND gate 338 performs a logical AND of the A-phase base signal FSA and the signal Q334 and generates the second A-phase driving signal DRVA2 representing the logical product.

In the A-phase power generation signal generator circuit 314, the comparator 340 compares the A-phase sensor signal SSA with a voltage representing an intermediate value of the amplitude of the A-phase sensor signal SSA (hereafter referred to as 'intermediate voltage') and outputs a changeover signal Q340 representing a result of the comparison. The intermediate voltage is obtained from the electronic variable resistor 328. The inverter 342 outputs an inverted signal Q342 of the changeover signal Q340. The OR gate 344 functioning as the negative-logic AND gate inputs the signal Q332 and the inverted signal Q342 and outputs a signal Q344. The OR gate 346 functioning as the negative-logic AND gate inputs the signal Q334 and the changeover signal Q340 and outputs a signal Q346. The NAND gate 348 performs a logical AND of the A-phase base signal FSA and the signal Q344 and generates the first A-phase power generation signal REGA1 as an inverted output of the logical product. The NAND gate 350 performs a logical AND of the A-phase base signal FSA and the signal Q346 and generates the second A-phase power generation signal REGA2 as an inverted output of the logical product.

In the B-phase driving signal generator circuit 316, the comparator 352 compares the voltage value V1 with the B-phase sensor signal SSB and outputs a signal Q352 representing a result of the comparison. The comparator 354 compares the voltage value V2 with the B-phase sensor signal SSB and outputs a signal Q354 representing a result of the comparison. The AND gate 356 performs a logical AND of the B-phase base signal FSB and the signal Q352 and generates the first B-phase driving signal DRVB1 representing the logical product. The AND gate 358 performs a logical AND of the B-phase base signal FSB and the signal Q354 and generates the second B-phase driving signal DRVB2 representing the logical product.

In the B-phase power generation signal generator circuit 318, the inverters 360 and 362 respectively invert the B-phase base signal FSB and output the first B-phase power generation signal REGB1 and the second B-phase power generation signal REGB2.

Figure 5:
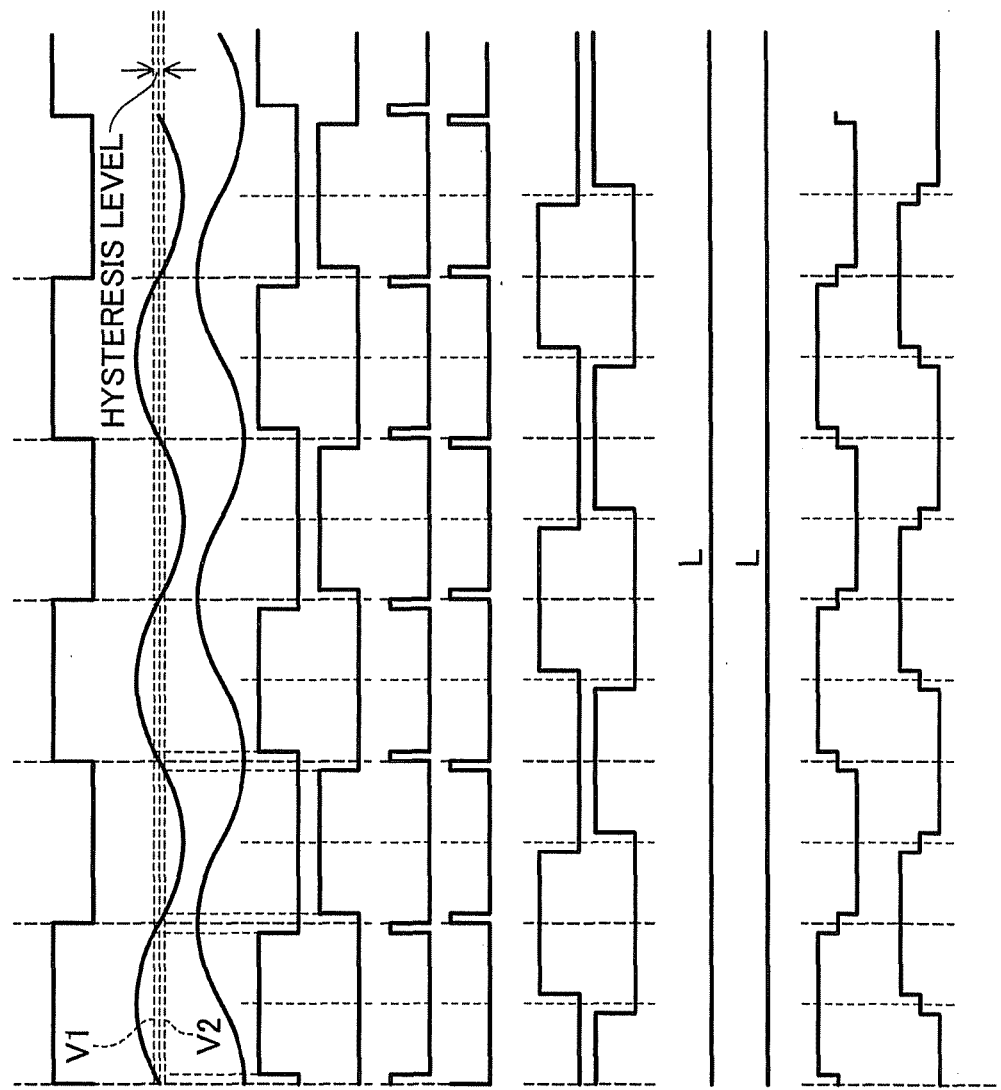
FIG. 5 is one timing chart showing variations of the respective signals generated by the driving signal/power generation signal generator 300.

FIG. 5 is one timing chart showing variations of the respective signals generated by the driving signal/power generation signal generator 300. The timing chart of FIG. 5 includes waveforms of an A-phase coil end-to-end signal and a B-phase coil end-to-end signal as signals between both ends of the A-phase coil array 14A and the B-phase coil array 24B. Waveforms of the A-phase coil end-to-end signal and the B-phase coil end-to-end signal are also included in the timing chart of FIG. 6 discussed later. In the illustrated example of FIG. 5, the A-phase base signal FSA and the B-phase base signal FSB are set at the H level (not shown). The A-phase coil array 14A activates the driving function and the power generation function, and the B-phase coil array 24B activates only the driving function. Namely the power generator 1000 is controlled to mainly activate the driving function in the state of FIG. 5.

The duty ratio setter 304 (FIG. 4) sets the resistance value Rv in the electronic variable resistor 322, in response to a command from the CPU 202 (FIG. 1). Setting the resistance value Rv determines the voltage values V1 and V2 and defines a hysteresis level as shown in FIG. 5. The 'hysteresis level' means a range of voltage between the voltage value V1 and the voltage value V2.

The A-phase driving signal generator circuit 312 (FIG. 4) generates the first A-phase driving signal DRVA1 and the second A-phase driving signal DRVA2 according to the hysteresis level as shown in FIG. 5. The first A-phase driving signal DRVA1 has an H level in response to the A-phase sensor signal SSA of higher than the voltage value V1. The second A-phase driving signal DRVA2 has an H level in response to the A-phase sensor signal SSA of lower than the voltage value V2.

The A-phase power generation signal generator circuit 314 (FIG. 4) generates the first A-phase power generation signal REGA1 and the second A-phase power generation signal REGA2 as shown in FIG. 5. The first A-phase power generation signal REGA1 has an H level in response to an H level of the changeover signal Q340 and an L level of the first A-phase driving signal DRVA1. The second A-phase power generation signal REGA2 has an H level in response to an L level of the changeover signal Q340 and an L level of the second A-phase driving signal DRVA2.

The B-phase driving signal generator circuit 316 (FIG. 4) generates the first B-phase driving signal DRVB1 and the second B-phase driving signal DRVB2 according to the hysteresis level as shown in FIG. 5. The first B-phase driving signal DRVB1 has an H level in response to the B-phase sensor signal SSB of higher than the voltage value V1. The second B-phase driving signal DRVB2 has an H level in response to the B-phase sensor signal SSB of lower than the voltage value V2.

The B-phase power generation signal generator circuit 318 (FIG. 4) generates the first B-phase power generation signal REGB1 and the second B-phase power generation signal REGB2 as shown in FIG. 5. In the illustrated example of FIG. 5, the B-phase base signal FSB is set at the H level. The first B-phase power generation signal REGB1 and the second B-phase power generation signal REGB2 accordingly have an L level over the whole time period of FIG. 5. Namely with regard to the B-phase, only the driving function is activated, while the power generation function is inactive.

As described previously, one procedure of control varies the resistance value Rv corresponding to the wind speed Vc measured by the wind speed meter 203 and changes the duty ratios of the driving signal DRV and the power generation signal REG to control the rotation speed of the generator motor 100. Another procedure of control varies the levels of the A-phase base signal FSA and the B-phase base signal FSB corresponding to the wind speed Vc measured by the wind speed meter 203 and changes the power generation time period and the driving time period with regard to each phase to control the rotation speed of the generator motor 100.

Figure 6:
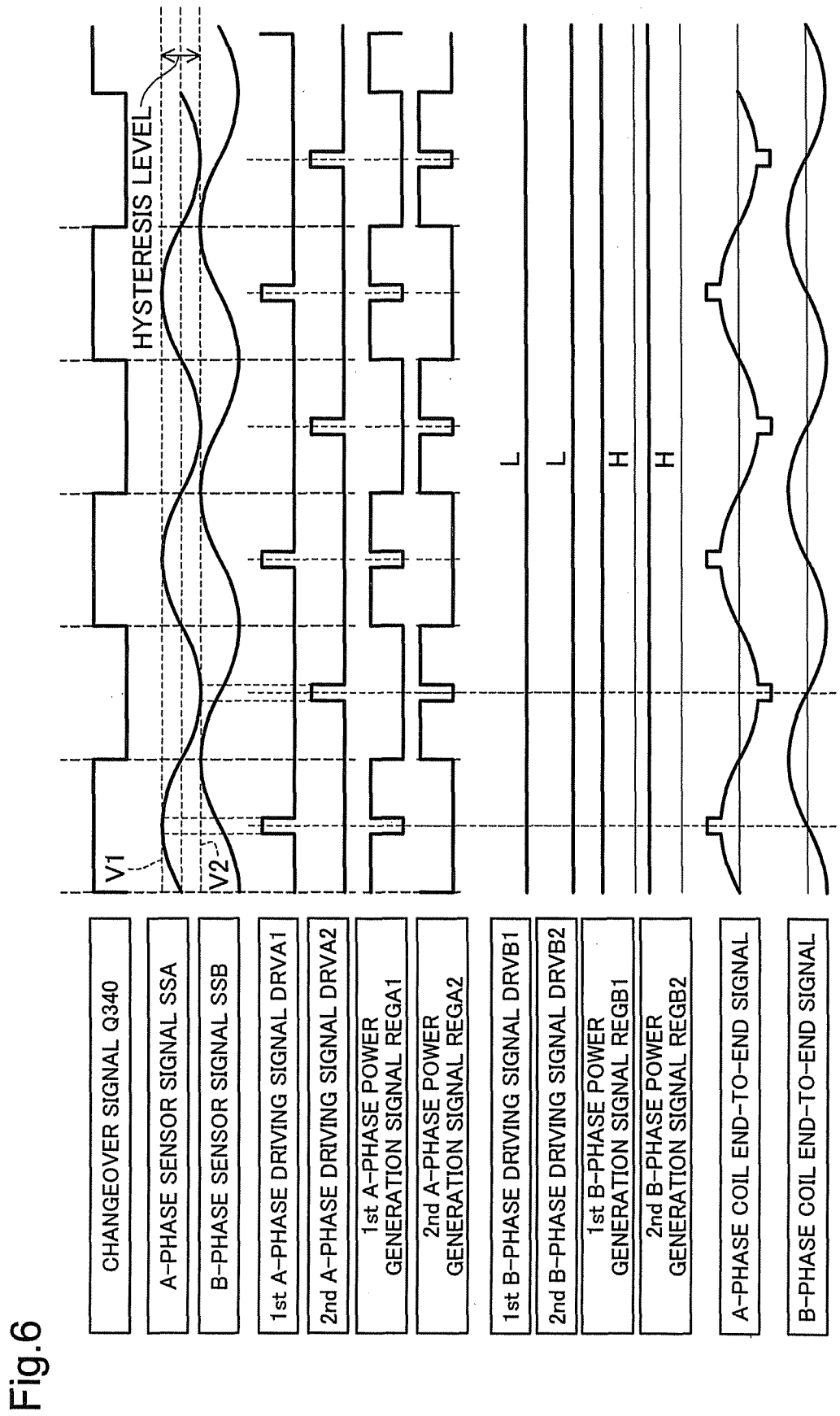
FIG. 6 is another timing chart showing variations of the respective signals generated by the driving signal/power generation signal generator 300.

FIG. 6 is another timing chart showing variations of the respective signals generated by the driving signal/power generation signal generator 300. In the illustrated example of FIG. 6, the A-phase base signal FSA has the H level and the B-phase base signal FSB has the L level. The A-phase coil array 14A accordingly activates both the driving function and the power generation function, while the B-phase coil array 24B activates only the power generation function. The state of FIG. 6 has a greater hysteresis level than that in the state of FIG. 5 and accordingly has the smaller duty ratios of the first A-phase driving signal DRVA1 and the second A-phase driving signal DRVA2 and the greater duty ratios of the first A-phase power generation signal REGAL and the second A-phase power generation signal REGA2 compared with those in the state of FIG. 5. The timing chart of FIG. 6 shows the variations of the respective signals in the condition of weak wind force. The power generator 1000 sets the shorter driving time period for the A-phase coil array 14A to assist the rotation of the generator motor 100, while performing power generation during the power generation time period of the A-phase coil array 14A and the whole time period of the B-phase coil array 24B.

Setting the power generation signal REG at the H level during the non-driving time period having the driving signal DRV of the L level enables the A-phase coil array 14A to perform power generation in the non-driving time period, while driving the A-phase coil array 14A with the A-phase driving signals DRVA1 and DRVA2 in the driving time period. This arrangement desirably enhances the power generation efficiency.

Figure 7:
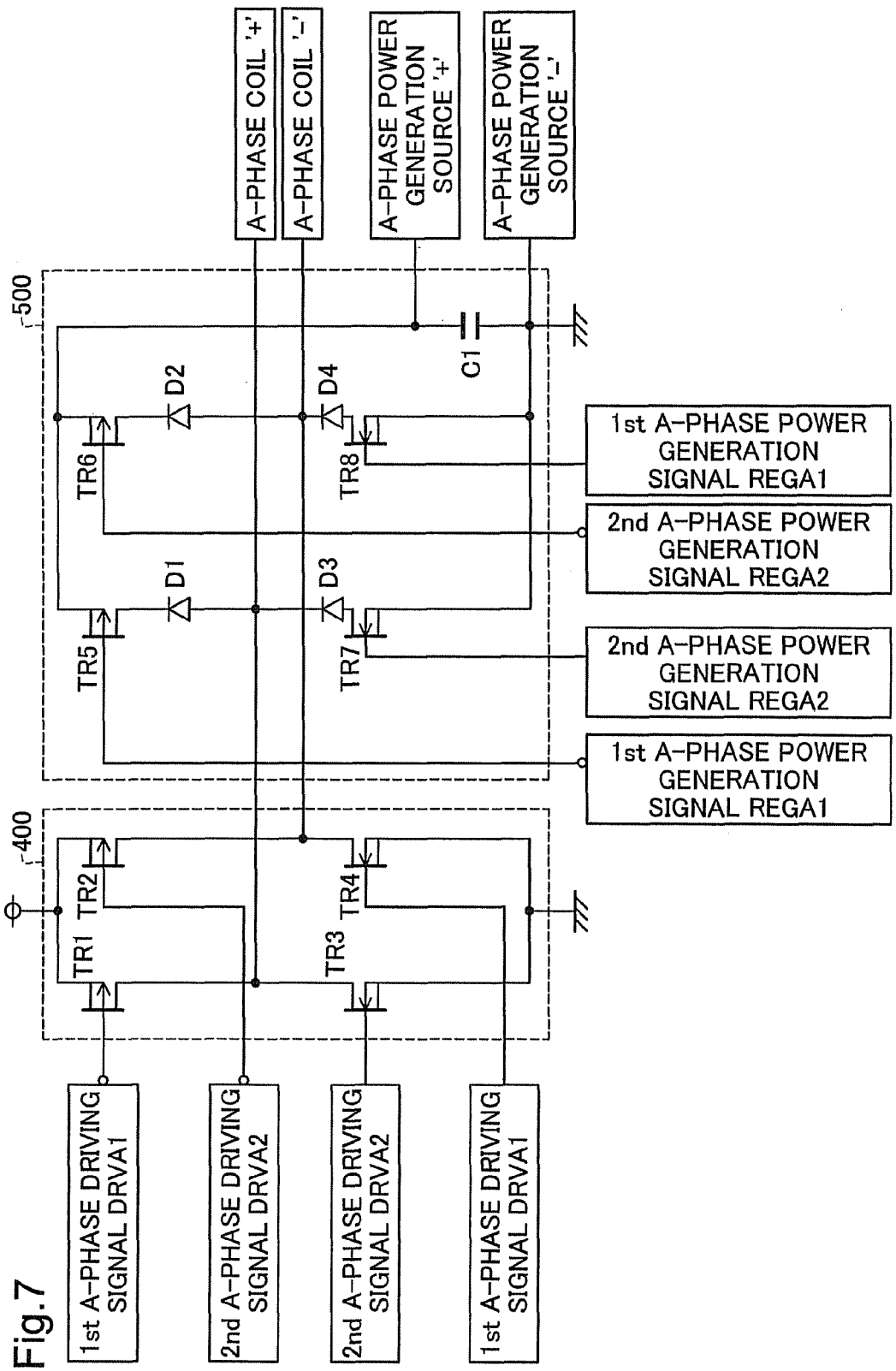
FIG. 7 is a circuit diagram showing the internal structure of the driving circuit assembly 400 and the power generation circuit assembly 500 with regard to the A-phase coil array 14A.

FIG. 7 is a circuit diagram showing the internal structure of the driving circuit assembly 400 and the power generation circuit assembly 500 with regard to the A-phase coil array 14A. The same circuit structure is provided with regard to the B-phase coil array 24B, although not being specifically illustrated. The driving circuit assembly 400 includes four transistors TR1 through TR4. The first A-phase driving signal DRVA1 is used to drive the transistors TR1 and TR4, while the second A-phase driving signal DRVA2 is used to drive the transistors TR2 and TR3. When the first A-phase driving signal DRVA1 has the H level to drive the transistors TR1 and TR4, the electric current flows in a direction from a positive (+) terminal of the A-phase coil array 14A (A-phase coil '+') to a negative (−) terminal of the A-phase coil array 14A (A-phase coil '−'). When the second A-phase driving signal DRVA2 has the H level to drive the transistors TR2 and TR3, on the other hand, the electric current flows in a direction from the A-phase coil '−' to the A-phase coil '+'. Such inversion of the direction of electric current flowing through the A-phase coil array 14A drives and rotates the generator motor 100. In the condition of strong wind force that requires braking the generator motor 100, on the other hand, the first A-phase driving signal DRVA1 and the second A-phase driving signal DRVA2 input into the transistors TR1 through TR4 are exchanged. In this application, the direction of electric current flowing through the A-phase coil array 14A becomes opposite to the direction of electric current for driving the generator motor 100 and accordingly brakes the generator motor 100.

The power generation assembly 500 includes four transistors TR5 through TR8, four diodes D1 through D4, and one capacitor C1. The first A-phase power generation signal REGA1 is used to drive the transistors TR5 and TR8, while the second A-phase power generation signal REGA2 is used to drive the transistors TR6 and TR7. When the first A-phase power generation signal REGA1 has the H level to drive the transistors TR5 and TR8, energy excited on the A-phase coil array 14A flows through the A-phase coil '+', the diode D1, and the transistor TR5, is charged into the capacitor C1, and returns through the transistor TR8, the diode D4, and the A-phase coil '−'. When the second A-phase power generation signal REGA2 has the H level to drive the transistors TR6 and TR7, energy excited on the A-phase coil array 14A flows through the A-phase coil '−', the diode D2, and the transistor T6, is charged into the capacitor C1, and returns through the transistor TR7, the diode D3, and the A-phase coil '+'.

In the condition of adequate wind force having appropriate strength for power generation, in the case of selection of the power generation mode, all the transistors TR1 through TR4 in the driving circuit assembly 400 are kept continuously off, while all the transistors TR5 through TR8 in the power generation circuit assembly 500 are kept continuously on. The generator motor 100 accordingly performs only power generation.

As described above, the control procedure of the embodiment selects the operation mode of the generator motor 100 according to the observed wind speed Vc and adequately controls the power generation time period and the driving time period of the generator motor 100. This arrangement ensures adequate control of the rotation speed of the generator motor 100 irrespective of a variation in wind speed Vc.

B. Modified Examples of First Embodiment

The first embodiment and its applications discussed above are to be considered in all aspects as illustrative and not restrictive. There may be many modifications, changes, and alterations without departing from the scope or spirit of the main characteristics of the present invention. Some examples of possible modification are given below.

B1. Modified Example 1

The control procedure of the first embodiment uses the observed wind speed Vc to select and activate one operation mode or a combination of multiple operation modes among the five possible operation modes of the generator motor 100. One modification may use the current rotation speed of the generator motor 100 to select and activate one operation mode or a combination of multiple operation modes among the five possible operation modes of the generator motor 100. Another modification may use both the observed wind speed Vc and the current rotation speed of the generator motor 100 to select and activate one operation mode or a combination of multiple operation modes among the five possible operation modes of the generator motor 100.

B2. Modified Example 2

In the power generator 1000 of the first embodiment, the generator motor 100 has the five operation modes. The generator motor 100 may have additional operation modes other than the five operation modes. The generator motor 100 may have only the power generation mode. The rotation speed of the generator motor 100 may be controlled according to the wind force in the power generation mode.

B3. Modified Example 3

In the power generator 1000 of the first embodiment, the generator motor 100 has the two phases, the A phase and the B phase (see FIG. 2A). The number of phases is, however, not restricted to the two phases, but the generator motor 100 may have a single phase or three or a greater number of phases.

B4. Modified Example 4

The first embodiment describes application of the invention to the wind power generator 1000. The technique of the invention is, however, not restricted to the wind power generator but may be applicable to any of various power generators for fluid power generation with the force of a fluid such as hydraulic power units.

B5. Modified Example 5

The generator motor 100 of the first embodiment may be used alone, instead of being incorporated in the power generator 1000. In application of the generator motor 100 as a power source of a moving body, the generator motor 100 is driven and operated as the motor in the driving time period, while working as the generator to generate electric power in the power generation time period other than the driving time period. Controlling the power generation time period and the driving time period regulates the speed of the moving body.

B6. Modified Example 6

In the power generator 1000 of the embodiment, the driving signal/power generation signal generator 300 (FIG. 4) is designed to have a rise of the power generation signal REG at the moment of a fall of the driving signal DRV (see FIGS. 5 and 6). The driving signal/power generation signal generator 300 may alternatively be designed to have a rise of the power generation signal REG on elapse of a preset time period after a fall of the driving signal DRV.

B7. Modified Example 7

In the power generator 1000 of the embodiment, the driving mode is activated when the generator motor 100 is at stop. The driving mode may be activated in the condition of the low wind speed Vc or the low rotation speed even when the generator motor 100 is not at stop.

C. Second Embodiment

Figure 8:
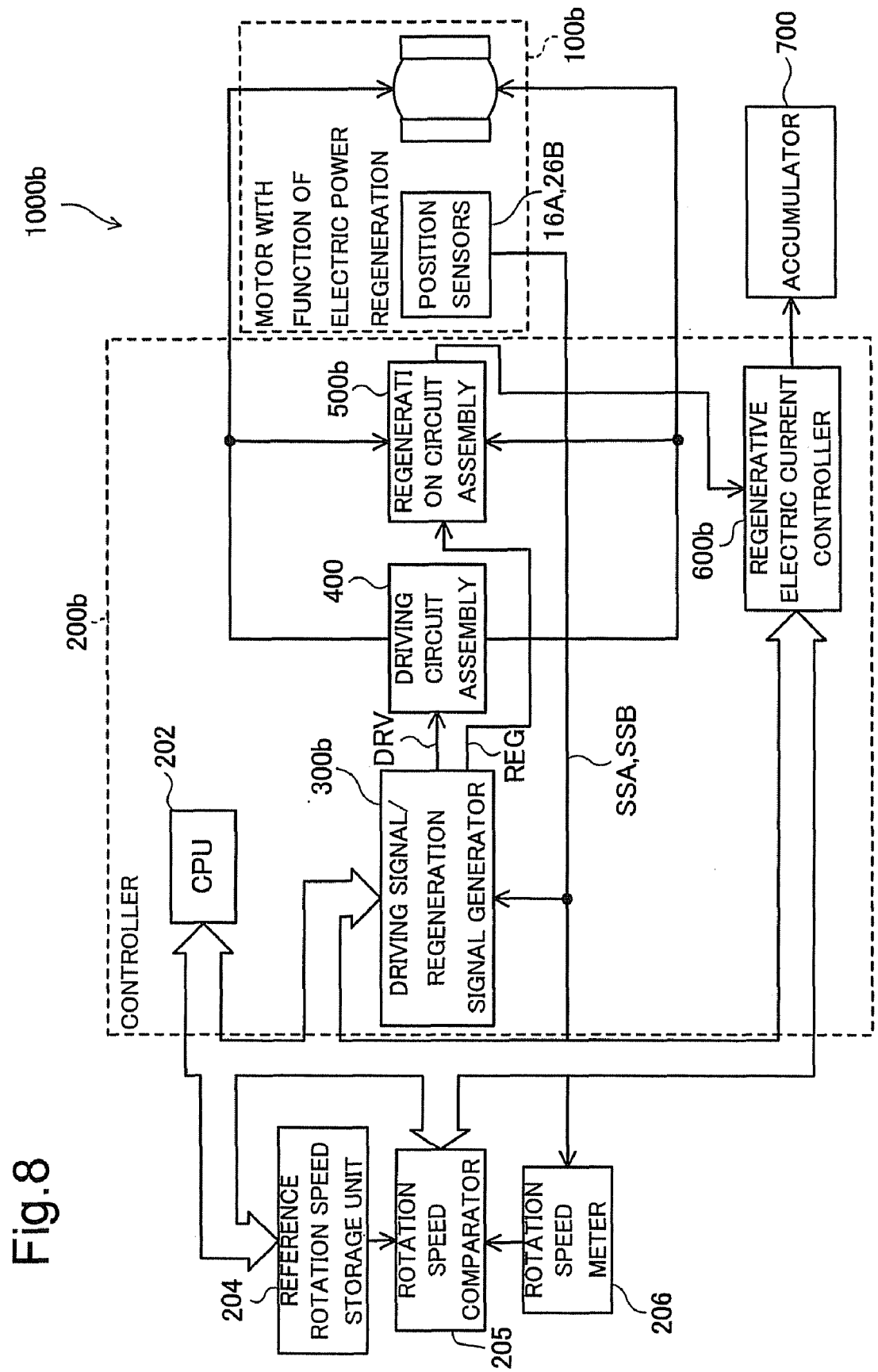
FIG. 8 is a block diagram schematically illustrating the general configuration of a motor device 1000b in a second embodiment of the invention.

FIG. 8 is a block diagram schematically illustrating the general configuration of a motor device 1000b in a second embodiment of the invention. The motor device 1000b of the second embodiment has the similar structure to that of the power generator 1000 of the first embodiment shown in FIG. 1, except that the blades 190 and the wind speed meter 203 are omitted from the structure of the second embodiment and that the generator motor 100 of the first embodiment is replaced by a motor 100b having a function of electric power regeneration in the structure of the second embodiment. The driving signal/power generation signal generator 300, the power generation circuit assembly 500, and the power generation current controller 600 in the power generator 1000 of the first embodiment are respectively replaced by a driving signal/regeneration signal generator 300b, a regeneration circuit assembly 500b, and a regenerative electric current controller 600b in the motor device 1000b of the second embodiment. These elements 300b, 500b, and 600b of the second embodiment, however, have substantially the same internal structures and operations as those of the corresponding elements 300, 500, and 600 of the first embodiment.

As in the power generator 1000 of the first embodiment, in the motor device 1000b of the second embodiment, the motor 100b is operated with a driving signal DRV and a regeneration signal REG (power generation signal) (see FIGS. 5 and 6) to control the driving torque and the rotation speed and to regenerate electric power during a time period having an H level of the regeneration signal REG. The regenerated electric power is accumulated in the accumulator 700. The regenerative electric current controller 600b regulates the regenerated electric current to control the braking force of the motor 100b.

Figure 9:
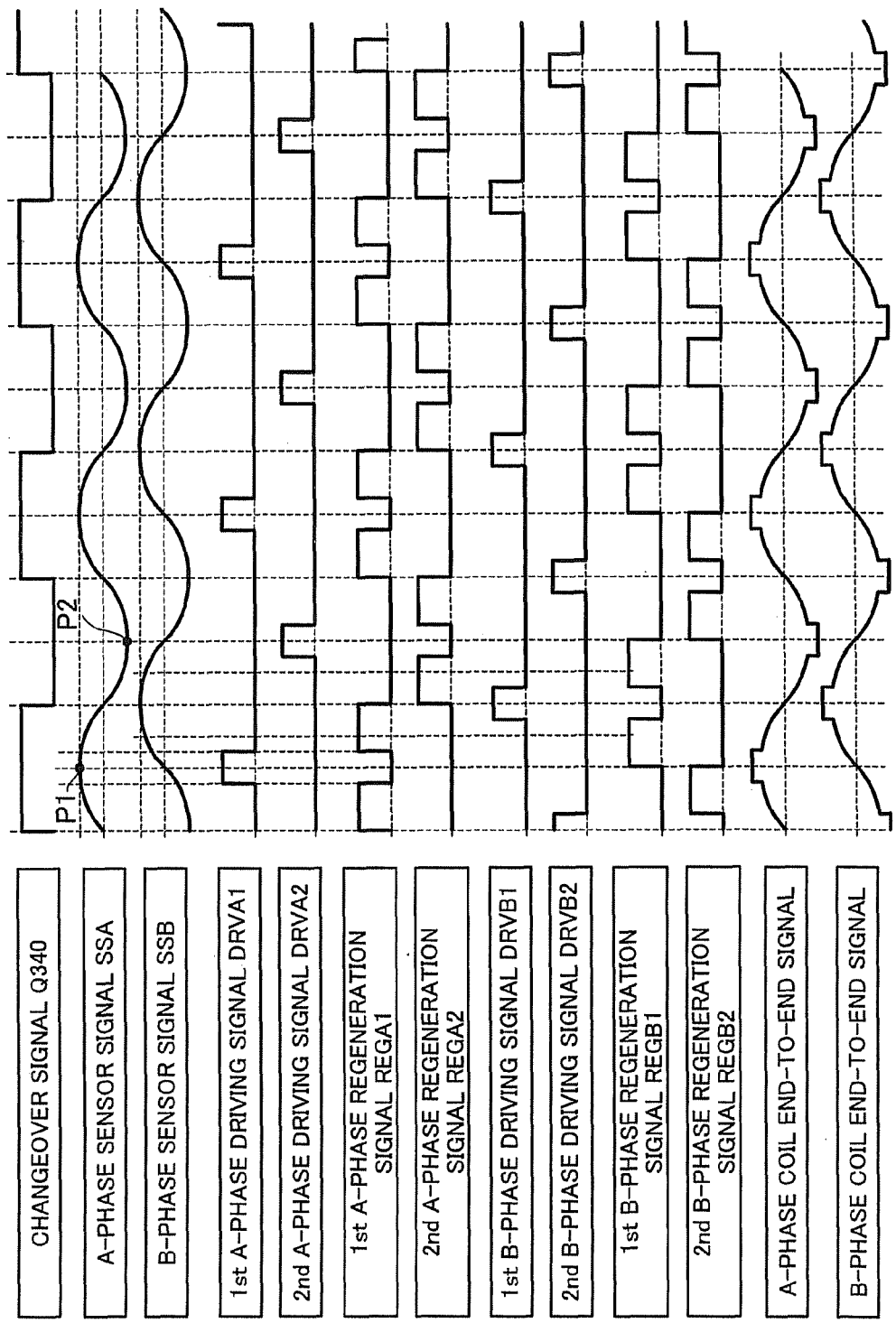
FIG. 9 is one timing chart showing variations of the respective signals generated by the driving signal/regeneration signal generator 300b.

FIG. 9 is one timing chart showing variations of the respective signals generated by the driving signal/regeneration signal generator 300b (FIG. 8). As mentioned above, the driving signal/regeneration signal generator 300b has substantially the same internal structure as that of the driving signal/power generation signal generator 300 of the first embodiment shown in FIG. 4. The driving signal/regeneration signal generator 300b sets an H-level time period of the driving signal DRVA1 and an H-level time period of the driving signal DRVA2 (that is, a voltage application time period or a driving time period) as substantially symmetrical time periods about a maximum point P1 and about a minimum point P2 of the A-phase sensor signal SSA. In the driving signal/regeneration signal generator 300b, the duty ratio setter 304 (see FIG. 4) may be designed to arbitrarily change the duration of the voltage application time period (duty ratio). The driving signal/regeneration signal generator 300b sets an H-level time period of the regeneration signal REGA1 and an H-level time period of the regeneration signal REGA2 (that is, an electric power regeneration time period) in a residual time period other than the voltage application time period. In the driving signal/regeneration signal generator 300b, the duty ratio setter 304 (see FIG. 4) may also be designed to arbitrarily change the duration of the electric power regeneration time period (duty ratio).

Figure 10:
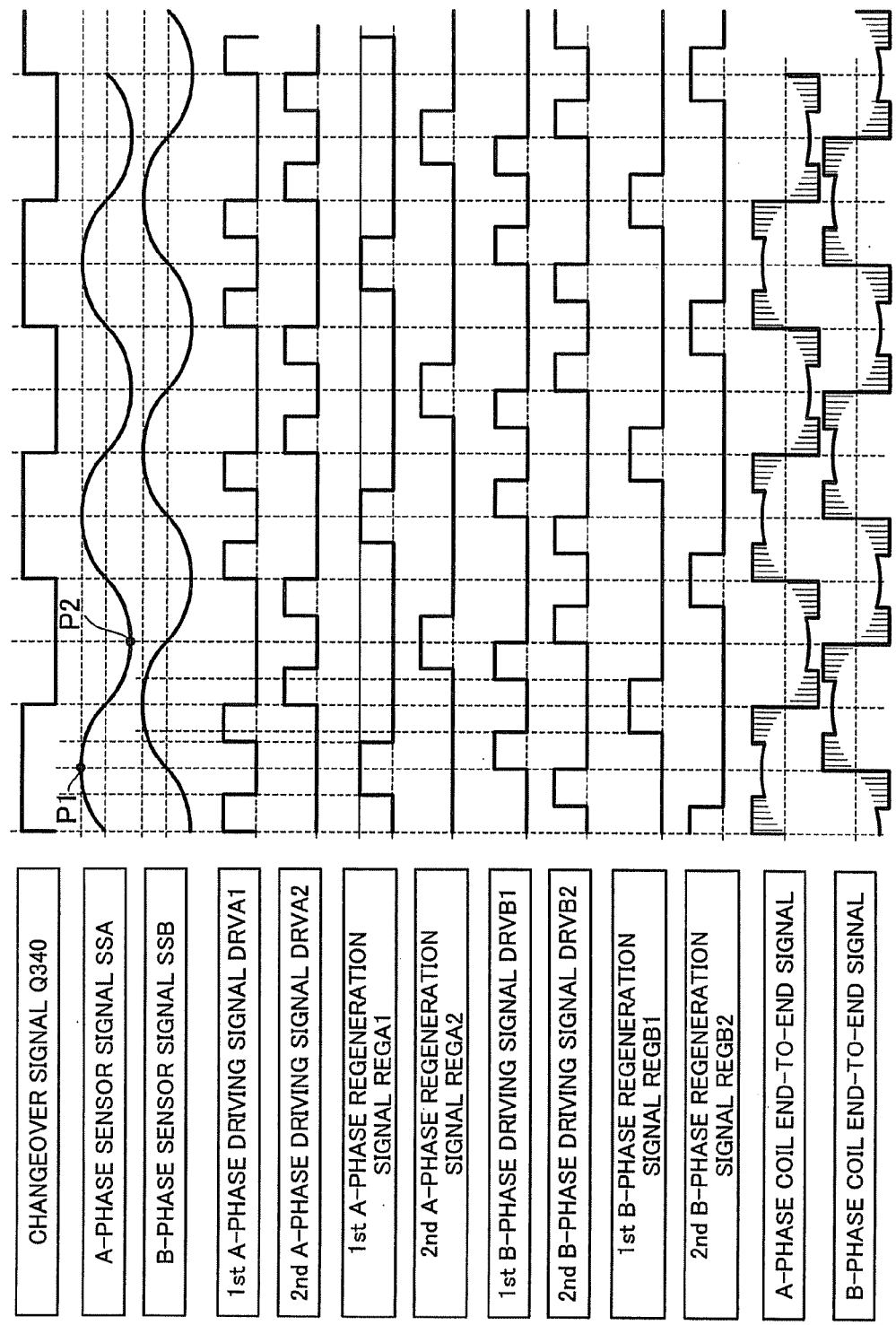
FIG. 10 is another timing chart showing variations of the respective signals generated by the driving signal/regeneration signal generator 300b.

FIG. 10 is another timing chart showing variations of the respective signals generated by the driving signal/regeneration signal generator 300b. The timing chart of FIG. 10 has different waveforms of the driving signals DRVA1 and DRVA2 and the regeneration signals REGA1 and REGA2 from the waveforms in the timing chart of FIG. 9. In the illustrated example of FIG. 10, the electric power regeneration time periods are set as substantially symmetrical time periods about the maximum point P1 and the minimum point P2 of the A-phase sensor signal SSA. This arrangement enables regeneration of electric power in a time period of high energy conversion efficiency, thus allowing the accumulator 700 to be charged rapidly. In this manner, the driving signal/regeneration signal generator 300b arbitrarily changes the temporal positions of the electric power regeneration time period and the voltage application time period relative to the A-phase sensor signal SSA.

As described above, in the motor device 1000b of the second embodiment, the driving signal/regeneration signal generator 300b controls the temporal positions and the durations of the voltage application time period and the electric power regeneration time period in one period of the A-phase sensor signal SSA. This arrangement ensures precise control of the torque and the rotation speed generated in the voltage application time period of the motor 100b and the electric power regenerated in the electric power regeneration time period of the motor 100b. The above description with regard to the control of the A phase is similarly applicable to the control of the B phase. The A phase and the B phase may be controlled independently.

What is claimed is:
1. A fluid power generator, comprising:
a rotating member that rotates by fluid force;
a generator motor that is mechanically linked with the rotating member and that is configured to function both as a generator and as a motor;
a rotation speed meter that measures a rotation speed of the generator motor;
a controller that controls the generator motor;
a position signal generator that generates a position signal representing a relative position of an electromagnetic coil to a permanent magnet in the power generator;
a driving signal generator that generates a driving signal specifying a driving time period of the electromagnetic coil, based on the position signal; and
a regeneration signal generator that generates a regeneration signal specifying an electric power regeneration time period of the electromagnetic coil, based on the position signal,
wherein the generator motor is operable in multiple different operation modes including:
(i) a mixed mode of performing a driving operation in parallel with a power generation operation, and
(ii) a driving mode of performing only the driving operation;
wherein in the mixed mode, the voltage application time period is set to appear periodically during each half cycle period of the position signal, and the electric power regeneration time period is set to appear in at least part of a residual time period other than the voltage application time period, and
wherein the controller selects one of the multiple operation modes and controls the generator motor in the selected operation mode to keep the rotation of the rotating member irrespective of the variation in flow rate of the fluid.

2. The fluid power generator according to claim 1, wherein the controller controls the generator motor to keep a rotation speed of the rotating member in a predetermined range.

3. The fluid power generator according to claim 1, wherein the generator motor has multiple phase coil arrays, and
the controller selectively applies either of the power generation operation and the driving operation for individual phase coil array out of the multiple phase coil arrays, in order to keep the rotation of the rotating member irrespective of the variation in flow rate of the fluid.

4. The fluid power generator according to claim 1, wherein
when the rotation speed of the generator motor exceeds a preset reference rotation speed, the controller drives the generator motor in an opposite direction to a rotating direction of the rotating member.

5. The fluid power generator according to claim 1, wherein
if the flow rate of the fluid has been not higher than a preset reference flow rate for more than a predetermined reference time period, the controller stops the control mode to keep the rotation of the rotating member.

6. The fluid power generator according to claim 1, wherein
when a result of subtraction of an amount of electric power consumed by the fluid power generator in a specific time period from an amount of electric power generated by the fluid power generator in the specific time period is less than a preset reference amount of electric power, the controller stops the control mode to keep the rotation of the rotating member.

7. A motor device having a function of electric power regeneration, comprising:
a position signal generator that generates a position signal representing a relative position of an electromagnetic coil to a permanent magnet in the motor device;
a driving signal generator that generates a driving signal specifying a voltage application time period of the electromagnetic coil, based on the position signal; and
a regeneration signal generator that generates a regeneration signal specifying an electric power regeneration time period of the electromagnetic coil, based on the position signal, wherein
the voltage application time period is set to appear periodically during each half cycle period of the position signal, and
the electric power regeneration time period is set to appear in a residual time period other than the voltage application time period.

8. The motor device according to claim 7, wherein
the regeneration signal generator sets the electric power regeneration time period to substantially symmetrical time periods about a maximum point and about a minimum point of the position signal.

9. The motor device according to claim 7, wherein
the driving signal generator is capable of changing a temporal position of the voltage application time period relative to the position signal and a duration of the voltage application time period, and
the regeneration signal generator is capable of changing a temporal position of the electric power regeneration time period relative to the position signal and a duration of the electric power regeneration time period.

10. The motor device according to claim 7, further comprising:
an accumulator that accumulates electric power regenerated in the electric power regeneration time period.

* * * * *